3,575,860
GREASE COMPOSITION
Chi-Long Lee, George J. Quaal, and Ollie W. Marko, Midland, Mich., assignors to Dow Corning Corporation, Midland, Mich.
No Drawing. Filed Jan. 6, 1969, Ser. No. 789,662
Int. Cl. C10m 7/50
U.S. Cl. 252—49.6    11 Claims

ABSTRACT OF THE DISCLOSURE

A solid homopolymer of trifluoropropylphenyl siloxane units is added to a lubricating oil vehicle in an amount sufficient to thicken to a grease.

---

This invention relates to improved grease compositions. In one aspect, the invention relates to novel, heat-stable greases which contain fluoroalkylphenylsiloxanes as thickeners.

Certain grease compositions, generally designated bearing greases, are designed to operate under high mechanical stresses. In addition to being stable at high loadings, these greases must be thermally stable at elevated temperatures. Other general purpose grease compositions serve as lubricants at lighter loadings and under less severe conditions.

These types of conventional greases are made by adding finely divided solid filler materials, such as silica, to a lubricating oil vehicle in an amount sufficient to thicken the mixture to a butter-like consistency. The particulate fillers do not enhance the thermal stability of the grease and in some instances the filler material reduces the lubricity of the grease because of the abrasive nature of the solid.

By the practice of the invention, wherein fluoroalkylphenylsiloxane polymers are utilized as grease thickeners, there is provided a thermally stable grease. The thickening polymer is, in itself, a lubricant and enhances the lubricating characteristics of the resulting grease.

It is an object of the invention to provide an improved grease composition.

Another object of the invention is to provide an organopolysiloxane grease composition which retains all of the highly beneficial properties of known siloxane grease compositions and which possess enhanced thermal stability.

These and other objects of the invention will be apparent to one skilled in the art upon consideration of the following specification and appended claims.

According to the invention, there is provided a grease comprising an intimate mixture of a lubricating oil vehicle and a thickening amount of a solid polymeric composition consisting essentially of units of the formula

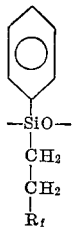

in which $R_f$ is a perfluoroalkyl radical containing from 1 to 10 carbon atoms.

The $R_f$ radical can be any perfluoroalkyl radical, for example —$CF_3$, —$C_2F_5$, —$C_3F_7$ and so on, through to the —$C_9F_{19}$ and —$C_{10}F_{21}$ members of the group. The radicals can be either straight or branched-chain structures.

The above-described homopolymer which is utilized as a thickener in the grease composition of the invention is, in itself, an excellent solid lubricant. The material can be made as a liquid, gum or solid. The solid is a semi-crystalline material which is soluble in aromatic hydrocarbon solvents, such as toluene. Generally, the solid polymer consists of at least 150 of the defined units and can be end-blocked with various substituents such as silanol or trimethylsilyl groups.

The polymeric thickeners can be prepared by polymerization of the corresponding cyclic trimer in the presence of a lithium catalyst, such as n-butyl lithium. The polymerization proceeds readily at temperatures of 100° C. and above. Examples of such polymerization are given in the copending application of C. L. Lee, Ser. No. 784,876, filed simultaneously herewith, the disclosure of which is herein incorporated. The preparation and isolation of the cyclic trimer precurser is described in the copending application of G. W. Holbrook, Ser. No. 784,875, also filed simultaneously herewith and incorporated herein.

It should be noted that, for any given fluid vehicle, there is a certain range of proportions of fluid to thickener which will result in an acceptable grease. The chemical substituents and viscosity of the fluid vehicle are factors determining this range. Excess thickener will cause the composition to be crumbly and unsuitable as a grease, while excess fluid will cause the mixture to be muddy. Simple experimentation can determine the proper ratio of thickener to fluid for any given system.

The lubricating oil vehicle can be any nonreactive, stable fluid with a viscosity at 25° C. of 20 to 600,000 cs., i.e., any oil that could be used in presently known greases.

The term "nonreactive" implies that the oil must be chemically nonreactive with the grease thickener, and to water, air, and other materials commonly found in the environment where the grease is to be used.

The term "stable" implies that the fluid must not easily decompose. The fluid must be stable throughout the temperature range in which the grease is to be employed.

Any fluid of the above description is suitable in the composition of this invention. Both hydrocarbon and non-hydrocarbon oils can be used. Examples of suitable fluids are as follows: naphthenic base, paraffinic base, and mixed base petroleum lubricating oils; other hydrocarbon lubricants, e.g., lubricating oils derived from coal products, and synthetic oils, e.g., alkylene polymers (such as polymers of propylene, butylene, etc., and mixtures thereof). Also, alkylene oxide-type polymers may be used, e.g., propylene oxide polymers produced by polymerizing propylene oxide in the presence of water or alcohols, e.g., ethyl alcohol; esters of ethylene oxide-type polymers, e.g., acetylated propylene oxide polymers prepared by acetylating propylene oxide polymers containing hydroxyl groups; polyethers prepared from alkylene glycols, e.g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, di-n-hexylfumaric polymer.

Synthetic oils of the alkyl aromatic type include those which are prepared by alkylating benzene (e.g., dodecylbenzene, tetradecylbenzene, didodecylbenzene, etc.). Polyhydric alcohol esters such as esters of trimethylol propane and pentaerythritol also have utility as base fluids.

Suitable organopolysiloxane fluid vehicles or base fluids for the grease are oily silicone polymers which are well-known in the art. Exemplary polymers include dimethylpolysiloxane, phenylmethylpolysiloxane, 3,3,3 - trifluoropropylmethylpolysiloxane, chlorophenylmethylpolysiloxane, ethylpropylpolysiloxane, and copolymers of the above. If it is desired to formulate a one-componet grease, the fluoroalkylphenylpolysiloxane can be produced with low molecular weight to give a fluid. Addition of the solid polymer to this base fluid yields a grease system based on only one chemical component.

A wide viscosity range of base fluids can be used. In special applications the organopolysiloxane base fluid can have a viscosity of as high as 600,000. An organopolysiloxane fluid base having viscosity in the range of from about 50 to 100,000 cs. is generally used. Preferred viscosities for the fluid range from 100 to 10,000 cs. at 25° C. A preferred species of the base fluid is

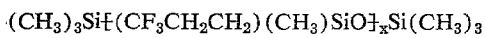

where $x$ is a positive integer which gives the polymer a viscosity of 100 to 10,000 cs. at 25° C. A grease composition based on this type of fluid vehicle has particular utility as high speed bearing grease.

In one embodiment of the invention the grease composition comprises an intimate mixture of 100 parts by weight of an organopolysiloxane base fluid having a viscosity of from 50 to 100,000 cs. at 25° C. and from 15 to 150 parts by weight of a homopolymer consisting essentially of at least 150 units of the formula

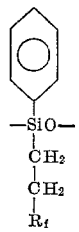

in which $R_f$ is a perfluoroalkyl radical containing from 1 to 10 carbon atoms inclusive.

The solid homopolymer, in finely-divided particulate form, is mixed with the fluid vehicle until a grease-like composition is formed. Any suitable mixing apparatus, such as 3-roll mill, an industrial shear mixer and the like, can be used in formulating the grease. The particle size of the thickener is not critical, but the particles are usually of the 1 to 100 micron size range. Larger size particles give a "grainy" grease which cannot be tolerated in certain applications.

In addition to the fluid vehicle and the thickener, the grease composition can contain small amounts of additives, such as pigments, antioxidants, corrosion inhibitors and the like. For reasons of economy, it may be desirable to add small quantities of other well-known thickeners to the grease of the invention.

The following examples are illustrative and are not to be considered as unduly limiting the invention which is delineated in the appended claims.

EXAMPLE 1

Forty-three parts by weight of 3,3,3-trifluoropropylphenylpolysiloxane, a hard solid polymer having a number average molecular weight of 100,000, were mixed with 100 parts by weight of 3,3,3-trifluoropropylmethylpolysiloxane fluid having a viscosity of 1000 cs. at 25° C. The fluid vehicle and thickener were mixed on a three roll mill until a grease of uniform consistency was obtained.

The following standard tests were employed to determine the properties of the grease:

Evaporation—ASTM Method D–927
Drop point—ASTM Method D–566
Heat stability (under mechanical shear as shown by penetration)—ASTM D–17–52T The grease product has the following physical properties:

Penetration:
    Unworked _____ 283
    Drop point, ° C. _____ 220
    Evaporation after 22 hours at 400° F. (percent) _____ 0.82

Lubrication properties of this grease were determined by the 4-Ball method and the Ball Bearing Life Test. The 4-Ball test was run on a Roxanna wear testing machine. In this test, a ½ inch steel ball is rotated against three stationary ½ inch steel balls at a rate of 1200 r.p.m. at a temperature of 400° F. under a load of 20 kilograms for 30 minutes. At the end of this time, the length and width of the scar formed on each stationary ball is determined and the average of these six measurements is taken as the wear scar diameter. The smaller the wear scar, the better the lubricant. The bearing test was run in accordance with Federal Standard 791, Method 33. The bearing was run at 10,000 r.p.m. under loads of 5 and 320 lbs. at a temperature of 450° F.

The results of these tests on the above grease were as follows:

4-Ball test, kg. _____ 20
Wear scar (mm.) _____ 0.73, 0.68
Life test, lbs.:                                 Hours
    5 _____ >1000
    320 _____ 200

These tests show that the grease has excellent lubrication properties which are retained for prolonged periods at elevated temperatures.

EXAMPLE 2

Fifty-nine parts by weight of the solid homopolymer described in Example 1 were mixed with 100 parts by weight of a dimethylpolysiloxane fluid having a viscosity of 350 cs. at 25° C. to form a grease having an off-mill penetration of 297. This grease was tested on the Roxanna wear testing machine under the conditions described in Example 1. Under a load of 4 kilograms, a wear scar of 0.75 millimeter was obtained.

EXAMPLE 3

Fifty-four parts by weight of the solid homopolymer of Example 1 were milled with 100 parts by weight of a trimethylsiloxy-endblocked copolymer consisting of 50 mol percent dimethylsiloxane units and 50 mol percent phenylmethylsiloxane units, having a viscosity of 150 cs. at 25° C., to form a grease having an off-mill penetration of 286. When tested as described in Example 2, a wear scar of 1.8 millimeters was obtained.

EXAMPLE 4

When 50 parts by weight of a homopolymer consisting of about 200 units of the formula

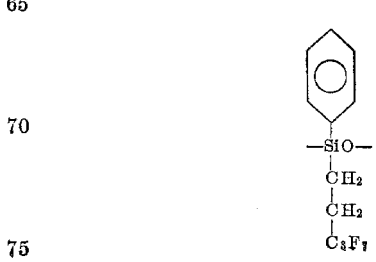

is milled with 100 parts of 3,3,3-trifluoropropylmethylpolysiloxane fluid, having a viscosity of 1000 cs. at 25° C. there is produced a grease having properties comparable to the grease of Example 1.

EXAMPLE 5

Fifty parts by weight of the homopolymer described in Example 1 were milled with 100 parts by weight of a polyol ester turbine oil having viscosity of 24.5 cs. at 25° C. to form a grease. The grease had the following penetrations:

| | |
|---|---|
| Original (off-mill) | 264 |
| Un-worked | 360 |
| Worked | 342 |

EXAMPLE 6

Fifty-five parts by weight of the homopolymer described in Example 1 were milled with 100 parts by weight of a commercially available petroleum-based lubricating oil to form a grease.

The grease had the following properties:

Penetration:
| | |
|---|---|
| Original | 272 |
| Un-worked | 245 |
| Worked | 398 |

EXAMPLE 7

Forty-eight parts by weight of the homopolymer of Example 1 were milled with 100 parts by weight of a copolymer of 50 mol percent dimethylpolysiloxane and 50 mol percent trifluoropropylmethylpolysiloxane having a viscosity of 100 cs. at 25° C. to form a stable grease.

The grease had the following properties:

Penetration:
| | |
|---|---|
| Original | 252 |
| Un-worked | 267 |
| Worked | 275 |

Reasonable modification and variation are within the scope of the invention which sets forth novel grease compositions.

That which is claimed is:

1. A grease comprising an intimate mixture of a lubricating oil vehicle and a thickening amount of a solid polymeric composition consisting essentially of units of the formula

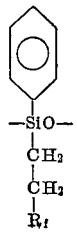

in which $R_f$ is a perfluoroalkyl radical containing from 1 to 10 carbon atoms inclusive.

2. The grease of claim 1 wherein $R_f$ is a trifluoromethyl radical.

3. The grease of claim 1 wherein said lubricating oil vehicle is an organopolysiloxane fluid.

4. The grease of claim 3 wherein said organopolysiloxane is 3,3,3-trifluoropropylmethylpolysiloxane.

5. The grease of claim 3 wherein said organopolysiloxane is copolymer containing dimethylsiloxane units and trifluoropropylmethylsiloxane units.

6. A grease comprising 100 parts by weight of an organopolysiloxane base fluid having a viscosity of from 50 to 100,000 cs. at 25° C.; and from 15 to 150 parts by weight of a homopolymer consisting essentially of at least 150 units of the formula

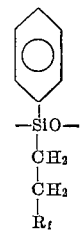

in which $R_f$ is a perfluoroalkyl radical containing from 1 to 10 carbon atoms inclusive.

7. The grease of claim 6 wherein said organopolysiloxane base fluid is a trifluoropropylmethylsiloxane polymer.

8. The grease of claim 6 wherein said organopolysiloxane base fluid is a dimethylsiloxane polymer.

9. The grease of claim 6 wherein said organopolysiloxane base fluid is a phenylmethylsiloxane polymer.

10. The grease of claim 6 wherein $R_f$ is a trifluoromethyl radical.

11. The grease of claim 6 wherein said organopolysiloxane base fluid has a viscosity of from 100 to 10,000 cs., at 25° C.

References Cited

UNITED STATES PATENTS

| | | | |
|---|---|---|---|
| 2,771,422 | 11/1956 | Browning et al. | 252—49.6 |
| 2,894,969 | 7/1959 | Pierce | 252—49.6 |
| 3,061,545 | 10/1962 | Badger | 252—49.6 |
| 3,288,712 | 11/1966 | Stark | 252—49.6 |
| 3,304,259 | 2/1967 | Wright | 252—49.6 |
| 3,314,889 | 4/1967 | Christian | 252—49.6 |

DANIEL E. WYMAN, Primary Examiner

I. VAUGHN, Assistant Examiner